(12) United States Patent
Agarwal et al.

(10) Patent No.: US 11,667,830 B2
(45) Date of Patent: Jun. 6, 2023

(54) IN LINE, CONTINUOUS PROPPANT COATING METHOD

(71) Applicant: Dow Global Technologies LLC, Midland, MI (US)

(72) Inventors: Praveen Agarwal, Lake Jackson, TX (US); Arjun Raghuraman, Pearland, TX (US); Juan Carlos Medina, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/296,871

(22) PCT Filed: Dec. 6, 2019

(86) PCT No.: PCT/US2019/064832
§ 371 (c)(1),
(2) Date: May 25, 2021

(87) PCT Pub. No.: WO2020/146068
PCT Pub. Date: Jul. 16, 2020

(65) Prior Publication Data
US 2022/0025249 A1    Jan. 27, 2022

Related U.S. Application Data

(60) Provisional application No. 62/881,149, filed on Jul. 31, 2019, provisional application No. 62/789,106, filed on Jan. 7, 2019.

(51) Int. Cl.
*C09K 8/70* (2006.01)
*C09K 8/80* (2006.01)

(52) U.S. Cl.
CPC .............. *C09K 8/70* (2013.01); *C09K 8/805* (2013.01)

(58) Field of Classification Search
CPC .................................. C09K 8/70; C09K 8/805
See application file for complete search history.

(56) References Cited

U.S. PATENT DOCUMENTS 2,706,188 A    4/1955   Fitco et al.
3,398,012 A    8/1968   Parkes et al.
(Continued)

FOREIGN PATENT DOCUMENTS

WO    2006023453 A1    3/2006
WO    2016160425 A1    10/2016
(Continued)

OTHER PUBLICATIONS

Office Action from corresponding Chinese 201980085695.9 application, dated Sep. 9, 2022.
(Continued)

*Primary Examiner* — Aiqun Li

(57) ABSTRACT

A continuous process for forming a coated proppant, said process comprising the steps of: (a) washing particles, (b) drying the particles at a first predetermined temperature, (c) cooling the particles, (d) feeding the cooled particles with a second predetermined temperature lower than the first predetermined temperature to an inlet of a combined continuous mixer and conveyor unit, (e) feeding a coating composition into the combined continuous mixer and conveyor unit, (f) mixing and simultaneously conveying the particles and the coating composition for a predetermined time, (g) curing the coating composition by transfer of heat from the particles, (h) discharging the coated particles from an outlet of the combined continuous mixer and conveyor unit, wherein said process does not comprise a step of heating the particles after the drying.

12 Claims, 1 Drawing Sheet

(56) References Cited

U.S. PATENT DOCUMENTS

| | | | |
|---|---|---|---|
| 8,697,185 B2 | 4/2014 | Mizwicki et al. | |
| 9,714,378 B2 | 7/2017 | Kumar et al. | |
| 9,725,645 B2 | 8/2017 | Monastiriotis et al. | |
| 9,896,620 B2 | 2/2018 | Zielinski et al. | |
| 9,944,845 B2 | 4/2018 | Tanguay et al. | |
| 2003/0170385 A1 | 9/2003 | Thompson et al. | |
| 2006/0035790 A1 | 2/2006 | Okell et al. | |
| 2008/0072941 A1 | 3/2008 | Jackson et al. | |
| 2013/0065800 A1* | 3/2013 | McDaniel | C09K 8/536 427/214 |
| 2015/0119301 A1 | 4/2015 | McDaniel et al. | |
| 2015/0360188 A1 | 12/2015 | Green et al. | |
| 2016/0024360 A1* | 1/2016 | Bestaoui-Spurr | C09K 8/805 427/221 |
| 2016/0186049 A1 | 6/2016 | Bothwell et al. | |
| 2016/0200965 A1 | 7/2016 | Farion et al. | |
| 2016/0257876 A1 | 9/2016 | Zielinski et al. | |
| 2018/0142140 A1 | 5/2018 | Zielinski et al. | |

FOREIGN PATENT DOCUMENTS

| | | |
|---|---|---|
| WO | 2017003813 | 1/2017 |
| WO | 2017213855 A1 | 12/2017 |
| WO | 2018175515 A1 | 9/2018 |

OTHER PUBLICATIONS

PCT/US2019/064832, International Search Report and Written Opinion dated Mar. 16, 2020.
PCT/US2019/064832, International Preliminary Report on Patentability dated Jun. 16, 2021.

* cited by examiner

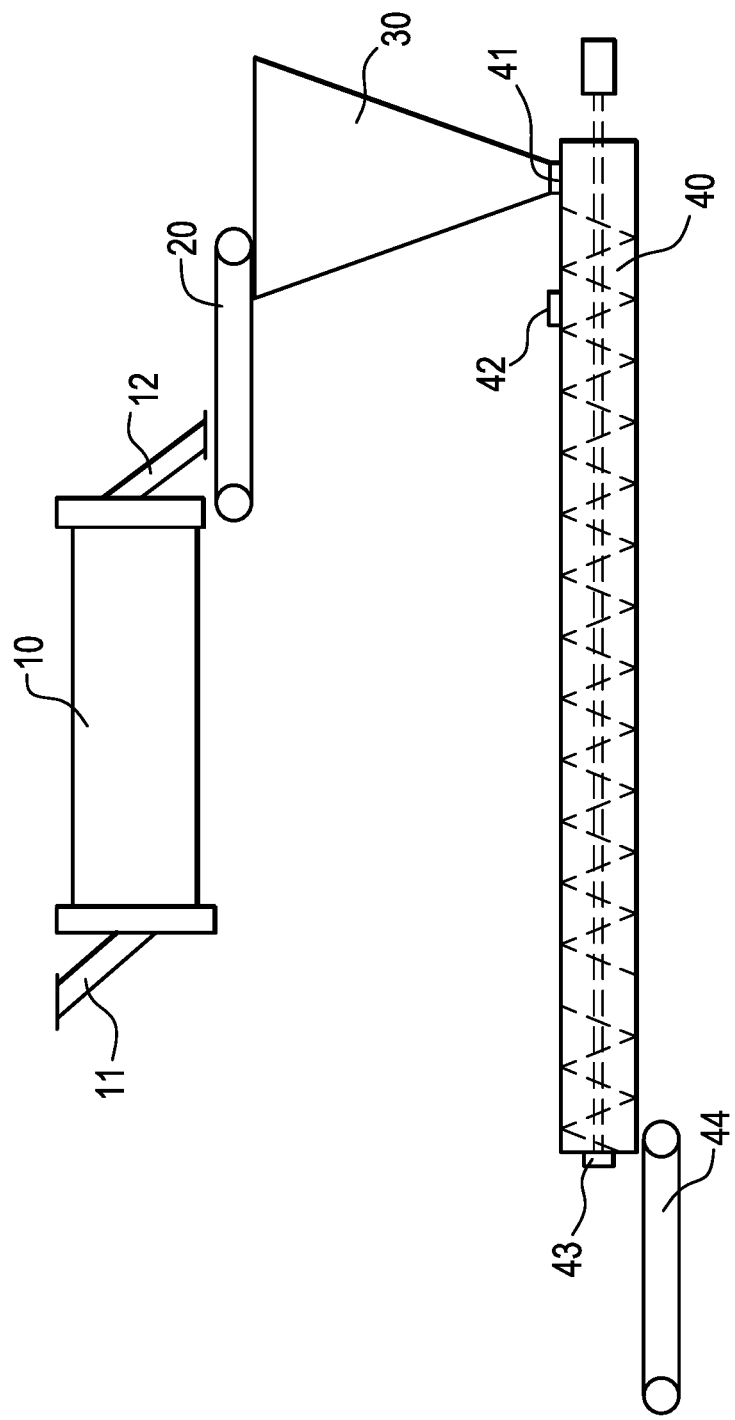

IN LINE, CONTINUOUS PROPPANT COATING METHOD

This application claims priority from the following U.S. Provisional Patent Applications, both of which are incorporated herein by reference: (1) U.S. Provisional Patent Application No. 62/789,106, filed on Jan. 7, 2019; and (2) U.S. Provisional Patent Application No. 62/881,149, filed on Jul. 31, 2019.

FIELD OF THE INVENTION

This invention relates to processes for preparing coated proppants.

INTRODUCTION

Oil and natural gas are obtained by drilling into subterranean reservoirs. Often, the oil and gas products are trapped within a geological formation that has low porosity and low permeability and cannot be extracted easily. These formations are often hydraulically fractured by pumping fluids at high pressure and velocity into the formations. Trapped oil and gas are released from the fractured formation. The fracturing also forms flow channels through which those products can travel into the well bore, from which they can be extracted.

Because of high localized pressures, those fractures and fissures tend to close when the fracturing step is completed. This shuts off the flow channels, reducing or eliminating the flow of product to the well bore. To avoid this problem, proppants often are injected into the well along with the hydraulic fracturing fluid. The proppants are solid materials that occupy space in the fractures and thus prevent them from becoming closed off. The proppants are in the form of small particles. Sand is widely used because it is readily available, inexpensive, and has a suitable particle size. Even though the proppant particles occupy space within the fractures, there is room in spaces between them for the oil and gas products to flow.

The flow of oil and gas can wash the proppants out of the formation and back into the well, a phenomenon known as "proppant flowback". This is undesirable because the fractures partially or entirely close once the proppants are washed away, leading to decreased production rates and downtime. The proppants need to be separated from the products, as well. The proppants, especially silica sand, are abrasive and can damage submersible pumps and other equipment if they are washed back to the wellbore.

A common way to reduce proppant flowback is by applying a polymeric coating to the particles. At the temperature and pressure conditions in the well, the polymer coating causes the particles to stick together and also to the underlying rock formation. This makes the particles more resistant to being washed out of the fractures and thus provides long term conductivity of the fractures enhancing the flow of oil and gas out of the well.

Among the polymers that have been used are phenolic resins, various epoxy resins, and isocyanate-based polymers that have urethane, urea, carbodiimide, isocyanurate and like linkages. Polymer-coated proppants of this type are described, for example, in WO 2017/003813, US Published Patent Application Nos. 2008-0072941 and 2016-0186049 and U.S. Pat. Nos. 9,725,645, 9,896,620 and 9,714,378.

While good performance has been obtained in some cases, these polymer systems suffer from significant drawbacks.

First, a very significant issue is the need to heat the particles to quite high temperatures before the coating process.

Typically, native particles are first treated in a wet plant where mud and slimes are separated, along with very fine particulates. The particles are then stockpiled to decant water, and are then sent to a drying plant where the particles are dried at a temperature typically close to 500-1500° C. to remove the water. The dried particles are then separated according to different size grades and stored in silos for transporting to transload sites or fracking site, i.e., a well. In a typical resin coating process, the stored particles are taken to a heating chamber, before being added to a coating vessel. Heating the particles above a temperature of 120° C. is typically essential before introducing the particles to the coating vessel. The heating step is needed either to melt the thermoplastic resins such as phenolic or to complete a curing reaction for thermoset resins such as polyurethanes. If inadequately cured, the polymer coating will not perform correctly in the formation—the coating or components thereof can leach out during transportation and handling, or in the subterranean formation, which is undesirable from an environmental and occupational hazard standpoint.

Even though the polymer coating is usually applied in small amounts such as a few weight percent based on the weight of the proppant particles, the entire mass of the proppant particles must be heated, which adds greatly to the expense of the coating process, including capital cost of the heating equipment and utility, and lowers throughput.

Second, the current state of the art commonly uses batch mixers to coat the particles with a resin(s) and other ingredients. That is, particles are pre-weighed, heated to the desired temperature and transferred into a batch mixer. Resin(s) and additives are then added sequentially and held in the mixer until the materials have reached the required cure stage. The mixture is then discharged out of the mixer and the cycle is repeated. There are several manipulative stages involved in the batch mix process used to create a free flowing product, and these stages require considerable transfer of the materials through various material handling systems within the process plant thereby consuming considerable energy.

Third, coating compositions for coating proppants tend be complex formulations, which makes continuous mix process undesirable.

Therefore, it is desired to develop a new continuous process for preparing coated proppants that eliminates the step of heating the particles after the drying process that is routinely carried out at proppant mines, thereby reducing the time, space, and energy consumption. Feeding a coating composition comprising a small number of ingredients that may further simplify the addition and the curing in the continuous process is also desired. The invention provides significant advantages from both the production and utility points of view. Unlike conventional processes, this process for preparing coated proppants is faster and more energy efficient, has low capital cost, and can be easily integrated in the pre-existing supply chain for handling uncoated particles. Unlike conventional processes, no transportation of proppants to a separate facility for coating is needed thereby providing a significant logistical advantage.

SUMMARY OF THE INVENTION

The present invention provides a continuous process for forming a coated proppant, said process comprising the steps of:

(a) washing particles, (b) drying the particles at a first predetermined temperature, (c) cooling the particles, (d) feeding the cooled particles with a second predetermined temperature lower than the first predetermined temperature to an inlet of a combined continuous mixer and conveyor unit, (e) feeding a coating composition into the combined continuous mixer and conveyor unit, (f) mixing and simultaneously conveying the particles and the coating composition for a predetermined time, (g) curing the coating composition by transfer of heat from the particles, (h) discharging the coated particles from an outlet of the combined continuous mixer and conveyor unit, wherein said process does not comprise a step of heating the particles after the drying.

BRIEF DESCRIPTION OF THE DRAWING

In the accompanying drawing, which is incorporated in and constitute a part of this specification, embodiments of the invention are illustrated, which, together with a general description of the invention given above, and the detailed description given below serve to illustrate the principles of this invention. The illustrated embodiments are not meant to limit the invention in such a way that simple modifications, such as those that could be made by one skilled in the art, are not also within the scope and spirit of the inventive concepts discussed and claimed herein. The present invention may be more readily understood by reference to FIG. 1.

FIG. 1 shows a schematic of the process for forming a coated proppant.

DETAILED DESCRIPTION OF THE INVENTION

The present invention provides a continuous process for forming a coated proppant, said process comprising the steps of:

(a) washing particles, (b) drying the particles at a first predetermined temperature, (c) cooling the particles, (d) feeding the cooled particles with a second predetermined temperature lower than the first predetermined temperature to an inlet of a combined continuous mixer and conveyor unit, (e) feeding a coating composition into the combined continuous mixer and conveyor unit, (f) mixing and simultaneously conveying the particles and the coating composition for a predetermined time, (g) curing the coating composition by transfer of heat from the particles, (h) discharging the coated particles from an outlet of the combined continuous mixer and conveyor unit, wherein said process does not comprise a step of heating the particles after the drying.

Preferably, said process does not comprise a step of cooling the coated particles after the discharging.

One example of the instant invention will now be described with reference to FIG. 1 of the accompanying drawing which illustrates schematically one form of apparatus for carrying out the process which is the subject of this invention.

Particles are typically washed to remove the very small size unwanted particulates such as clays. In the washing process, particles are mixed with water and passed through screens to remove large particulates, followed by removal of small clay particles using agitation, e.g., with cyclone separators.

Then, the wet particles are introduced into an inlet 11 of a dryer 10. The wet particles pass through the dryer 10 from the inlet 11 to an outlet 12, and are dried in the dryer 10 at a first predetermined temperature. Preferably, the first predetermined temperature is in the range of 500-1500° C.

In an embodiment, a drum dryer is used. Wet particles are moved by the rotation of the drum and by the conveying action of the fittings in the drum. Lifting blades pick up the wet particles from the bottom of the drum and allow them to drop again after lifting, as a result the wet particles come into contact with the hot drying air.

The dried particles are then cooled either in the dryer 10 or outside of the dryer 10. The dried particles may be cooled by evaporative cooling or air cooling. The evaporative cooling is based on a physical phenomenon in which evaporation of a liquid, usually water, into surrounding air cools an object or a liquid in contact with it. Air cooling works by expanding the surface area or increasing the flow of air over an object to be cooled, or both.

A combined drying-cooling drum system is available commercially from Allgaier Process Technology GmbH as Mozer TK.

The cooled particles with a second predetermined temperature lower than the first predetermined temperature in the drying process exiting the outlet 12 of the dryer 10 are fed in a continuous stream at a predetermined rate to a combined continuous mixer and conveyor unit 40, through a feed hopper 30 and then through an inlet 41, located at one end of the combined continuous mixer and conveyor unit 40, by conveyor belt 20, while feeding a coating composition into the combined continuous mixer and conveyor unit 40 through an injection port 42. The second predetermined temperature is usually in the range of 50° C. to 220° C.

In particular, the particles coming out of the dryer 10 are fed into the combined continuous mixer and conveyor unit 40 for coating the particles to allow the residual heat from the drying process be used in the coating process, thus eliminating heating steps after the drying process.

Alternatively, particles can be fed to a combined continuous mixer and conveyor unit by a blower. The combined continuous mixer and conveyor unit churns and mixes the materials, thereby providing an even coating on the particles. Alternatively, particles can be fed to a combined continuous mixer and conveyor unit by a screw feeder.

Alternatively, components of coating composition may be fed separately to the coating process at two or more locations along a travel path of the combined continuous mixer and conveyor unit into the combined continuous mixer and conveying unit. Thus, the mixture passes down the combined continuous mixer and convey unit where it passes under additional injection ports for components addition.

The particles and the coating composition are then mixed and pass through the combined continuous mixer and conveyor unit 40 to an outlet 43 of the combined continuous mixer and conveyor unit 40. The velocity of the mix is set by the rate of particles injection, the flow of the coating composition, the speed (and diameter) of the combined continuous mixer and conveyor unit and the cross-section of the conduit of the combined continuous mixer and conveyor unit. The coating composition is cured in the combined continuous mixer and conveyor unit by transfer of heat from the particles along the travel path of the combined continuous mixer and conveyor unit 40. The coated particles are delivered to the outlet 43 of the combined continuous mixer and conveyor unit 40 and are then delivered to a packaging or storage area by a discharge conveyor, a blower or a screw feeder. Once to the packaging or storage area, the coated particles can be bagged for shipping or dispensed into holding tanks, silos, or large piles for storage.

Essentially any mixer capable of thoroughly mixing solid particles on a continuous basis and moving mixtures through a travel path can be used for the combined continuous mixer and conveyor unit for the current invention. Preferred mixers are those which force the mixture to move from an inlet to an outlet along a travel path which is at least three, preferably at least five and even more preferably at least eight, times as long as it is wide. The inside diameter of the mixer may range from 10 inches to 20 inches and the length of the mixer may range from 80 inches 200 inches. An example is a paddle-type mixer having paddles arranged on a rotating shaft so as to push the mixture from the inlet to the outlet of the travel path. Another example is a screw (auger) type mixer. Yet, another example is a conveyance type mixer in which the travel path is arranged at an acute angle with respect to the horizontal plane, preferably in the range of about 30-60 degrees and most preferably at about a 45 degree angle.

The combined continuous mixer and conveyor unit may be capable of operating, for example, at a throughput of 50-200 ton/hour. Preferably the combined continuous mixer and conveyor unit is able to provide a residence time of up to three minutes to provide adequate time for the curing to occur. The combined continuous mixer and conveyor unit is available commercially, for example, from Palmer Manufacturing, WebAc, Tinker Omega and Del Sol Industrial Services as continuous sand mixers.

Depending on different types of mixers selected, the combined continuous mixer and conveyor unit may utilize a variety of mixing elements, such as pinned blade, ribbon blender, screw elements. Mixing elements could be arranged at a pitch and an angle to provide the mixing and transport of the particles. In one embodiment, the mixing elements could be arranged in such a way that there is high shear rate and vigorous mixing immediately after the coating compositions are added to the combined continuous mixer and conveyor unit to provide a uniform coating. The mixing element could then be adjusted to provide less vigorous mixing to minimize the power consumption while still providing the convection and residence time for the coating composition to cure and form a free flowing product.

In one embodiment of the present invention, the combined continuous mixer and conveyor unit is equipped with a single screw mixer, having a screw shaft, and associated screw paddles. The paddles are mounted to a screw shaft, at a pitch that will insure movement of the mix through the combined continuous mixer and conveyor unit as the screw shaft is rotated.

Multiple continuous mixers connected in series or parallel can be utilized to achieve the required throughput and curing time.

The screw mixers are driven by variable speed motors and the paddle pitch may be changed manually or automatically. Thus, the combination of paddle pitch and screw (auger) speed will set the residence time in the screw mixer. Some paddles may be adjusted to cause the mix to travel backward causing the mixture to "waver" in the screw mixer thereby increasing the residence time. The pitch may be chosen to lie at an angle between 3 degrees to 60 degrees to drive the material forward. If the pitch is too sharp the particles will be mixed and not transported, and, if the pitch is too flat the same result will be obtained.

The combined continuous mixer and conveyor unit receives hot particles at the input and has one or more injection ports for components of coating compositions. Injection ports for the coating composition may be distributed radially to add the coating composition uniformly on the particles. The actual physical location of the injection ports is set by process times and the velocity of the mix traveling down the combined continuous mixer and conveyor unit. The injection ports are in communication with storage facilities—tanks or silos as the material requires. Control valves (controlled by a control system) open as set by the product requirements and coat the particles. The term coat is used to mean physically coating or bonding to the particles as well as "coating" the particles with additives as required by a particular product. The additive coating or coatings may be considered as an encapsulation of the coat that is physically bonded to the particle.

As stated above, the injection ports can inject a material that bonds to a particle or inject a material that "coats" the particle or both. Thus, coating materials (or ingredients) may mean a material, such as resin, that bonds to the particle; or an additive, such as wax, that coats the bonded material. Different additives (ingredients) are used for different products. The inventors visualize a system were one or more ports are in communication with the same ingredient or different ingredients so that injection may occur at a different point in the mixing/coating process. The control system would choose which port is activated for a given product.

The coating composition (or any component thereof) can be applied by spraying or other suitable method. The particles are preferably stirred or otherwise agitated.

The particle can be of any material that is solid and thermally stable at a temperature of at least 100° C. Preferably, the particle is heat-stable at a temperature of at least 200° C. and more preferably at least 300° C. By "heat-stable", it is meant that the particle does not melt or otherwise heat-soften to form a flowable material, thermally degrade or decompose, at the stated temperature. Examples of particles include sand and other mineral and/or ceramic materials such as aluminum oxide, silicon dioxide, titanium dioxide, zinc oxide, zirconium dioxide, cerium dioxide, manganese dioxide, iron oxide, calcium oxide, boron nitride, silicone carbide, aluminum carbide, bauxite, aluminum oxide and glass, as well as metals such as metal shot.

The particles may have a particle size such that at least 90 weight-percent of the particles pass through a U.S. 15 mesh screen, which has nominal 4.0 mm openings. In some embodiments, at least 90 weight-% of the particles pass through a U.S. 10 mesh screen, which has nominal 2.0 mm openings, or at least 90 weight-% pass through a 20 mesh screen, which has nominal 1.0 mm openings. In some embodiments least 90 weight-% of the particles preferably are retained on a U.S. 400 mesh screen, a U.S. 200 mesh screen, a U. S. mesh 140 screen, which have nominal openings of 0.037 mm, 0.074 mm and 0.105 mm, respectively. Because the coating weights are low, as described below, the coatings are thin and the coated proppants generally have similar particle sizes.

Preferably, a coating composition comprises a polyisocyanate and an isocyanate trimerization catalyst. A mixture of two or more polyisocyanates may be present in the coating composition. More preferably, the coating composition only consists of a polyisocyanate and an isocyanate trimerization catalyst. Preferably, the coating composition is in liquid form.

The polyisocyanate preferably has an average functionality from about 1.9 to 4, and more preferably from 2.0 to 3.5. It is preferably a liquid at the application temperature. The average isocyanate equivalent weight can be from about 80 to 500, more preferably from 80 to 200 and still more preferably from 125 to 175. The polyisocyanates can be aromatic, aliphatic and/or cycloaliphatic. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenylmethane triisocyanate, polymethylene polyphenylisocyanates, hydrogenated polymethylene polyphenylisocyanates, toluene-2,4,6-triisocyanate, and 4,4'-dimethyl diphenylmethane-2,2',5,5'-tetraisocyanate. Preferred polyisocyanates include MDI and derivatives of MDI such as biuret-modified "liquid" MDI products and polymeric MDI. "Polymeric MDI" is a mixture of MDI (any isomer or mixture of isomers) with one or more polymethylene polyphenylisocyanates that have three or more phenylisocyanate groups. The "Polymeric MDI" may have, for example, an isocyanate equivalent weight of 126 to 150 and a number average isocyanate functionality of 2.05 to 3.5, especially 2.2 to 3.2 or 2.2 to 2.8.

The isocyanate trimerization catalyst is a material that promotes the reaction of isocyanate groups with other isocyanate groups to form isocyanurate rings. It preferably is at most a weak urethane and urea-forming catalyst, i.e., has little if any catalytic activity toward the reaction of an isocyanate group with an alcohol, water or a primary or secondary amine group under the conditions of the curing step. It is also preferably at most a weak carbodiimide catalyst, i.e., has little if any catalytic activity toward the reaction of isocyanate groups to form carbodiimides. Useful isocyanate trimerization catalysts include strong bases such as alkali metal phenolates, alkali metal alkoxides, alkali metal carboxylates, quaternary ammonium salts, and the like. Specific examples of such trimerization catalysts include sodium p-nonylphenolate, sodium p-octyl phenolate, sodium p-tert-butyl phenolate, sodium acetate, sodium 2-ethylhexanoate, sodium propionate, sodium butyrate, the potassium analogs of any of the foregoing, trimethyl-2-hydroxypropylammonium carboxylate salts, and the like.

The isocyanate trimerization catalyst may be provided in the form of a dispersion or solution in a carrier. The carrier in some embodiments is a such as ethylene glycol, diethylene glycol, propylene glycol, dipropylene glycol and the like.

Examples of useful commercially available trimerization catalysts include those sold as Dabco TMR18, Dabco TMR-30, Dabco TMR2, Dabco TMR-7, Dabco TMR-20 and Dabco TMR catalysts, from Air Products.

The isocyanate trimerization catalyst is present in catalytic quantities, such as from 0.05 to 10 parts by weight per 100 parts by weight of the polyisocyanate. In specific embodiments, this catalyst may be present in an amount of at least 0.1, 0.25, 0.5 or 1 part by weight per 100 parts by weight of the polyisocyanate, and may be present in an amount up to 7.5, up to 5 or up to 2.5 parts by weight per 100 parts by weight of the polyisocyanate.

All other components of the coating composition are optional and can be excluded from it. In particular, it is preferred that certain materials are absent or, if present, are present in only small amounts. Such materials include:

(a) Urethane, ureas and/or carbodiimide catalysts (other than the isocyanate trimerization catalyst) i.e., catalysts for the reaction of an isocyanate group toward an alcohol, water, a primary amino group or a second amino group, and/or of an isocyanate group with another isocyanate group to form a carbodiimide. If present at all, such catalysts are present in only very small quantities, such as no more than 0.01 part by weight per 100 parts by weight of the polyisocyanate. Among such catalysts are tin (II) and tin (IV) catalysts, catalysts that contain other Group III to Group XV metals; tertiary amine compounds, amidines, tertiary phosphines, phospholene oxides and the like, each of which preferably are absent or if present are present only in small quantities as indicated in the previous sentence.

(b) Alcohols, including both monoalcohols and polyalcohols. If present at all, these are preferably present in quantities no greater than 10 parts by weight more preferably no more than 5 parts by weight, per 100 parts by weight of the polyisocyanates. It is noted that commercial isocyanate trimerization catalyst products may contain alcohols having hydroxyl equivalent weights of up to 100 as a solvent or diluent; such small amounts are suitable for use in the coating composition. It is especially preferred that the coating composition contains no more than 5 parts, especially no more than 1 part and even more preferably no more than 0.01 part, of alcohols having an equivalent weight of greater than 100.

(c) Compounds having one or more primary and/or secondary amino groups. If present at all, these are preferably present in quantities no greater than 5 parts by weight, more preferably no greater than 2.5 parts by weight or no greater than 1 part by weight, per 100 parts by weight of the polyisocyanates.

The coating composition may further comprise certain optional components. An optional component of particular interest is a finely divided particulate solid, which does not melt, degrade or decompose under the conditions of the coating step or use of the coated proppants in a subterranean formation. The finely divided particulate solid should have a particle size much smaller than that of the particles. The particle size may be, for example, smaller than 100 μm, smaller than 10 μm, smaller than 1 μm, smaller than 500 nm or smaller than 100 nm, as measured by dynamic light scattering methods. The particle size may be at least 5 nm, at least 10 nm or at least 20 nm. Examples of such finely divided particles include fumed silica, various metals, various metal oxides, talc steatite, other ceramic particles, finely divided thermoset polymers, and the like. Fumed silica is particularly preferred.

The amount of finely divided particulate solid, when present, may be, for example, at least 1, at least 5, at least 10 or at least 25 parts by weight per 100 parts by weight of the polyisocyanate and up to 100, up to 75 or up to 50 parts by weight per 100 parts by weight of the polyisocyanate.

As discussed below, a finely divided particulate solid may be applied to the particles as part of the coating composition (i.e., at the same time the polyisocyanate and/or isocyanate trimerization catalyst are applied, prior to curing). Alternatively, the finely divided particulate solid may be applied after the coating composition has been applied and at least partially (or entirely) cured.

Water may be present in the coating composition. Although not necessary, water is sometimes useful as a carrier for the finely divided particulate solid, which in such cases may be provided in the form of a dispersion of the particles in water or an aqueous phase containing water. In cases in which the finely divided particulate solid is an ingredient of the coating composition, it is conveniently provided in the form of such a dispersion, and in such cases the coating composition may contain a significant quantity of water for that reason. Water, if present at all, may be present in an amount of, for example, up to 100 parts by weight per 100 parts by weight of the polyisocyanate and may be present in smaller amounts such as up to 75 or up to 50 parts by weight on the same basis. Although water can react with isocyanates to form ureas, this is believed to be minimized due to the substantial absence of a catalyst for the reaction of water with an isocyanate group. Urea formation can be avoided or minimized by applying the dispersion of finely divided particulate solid after the coating composition has been applied and at least partially cured.

Similarly, the coating composition may contain one or more other solvents or diluents, which may be present, for example, as a liquid phase in which the finely divided particles, the isocyanate trimerization catalyst or both are dispersed.

Another optional ingredient is an adhesion promoter. Examples of suitable adhesion promoters include hydrolysable silane compounds such as amino silanes (for example, 3-aminopropyl triethoxysilane) and epoxy silanes.

In specific embodiments, the coating composition includes (i) the polyisocyanate, (ii) the isocyanate trimerization catalyst, (iii) finely divided fumed silica particles, (iv) 0 to 10 parts (especially 0 to 5 parts) by weight), per 100 parts by weight of the polyisocyanate, of a mono- and/or polyalcohol, which alcohol preferably is a diluent for the isocyanate trimerization catalyst, (v) 0 to 100 parts (preferably 0 to 50 parts) by weight of water per 100 parts by weight of the polyisocyanate, which is preferably provided as a liquid phase in which the fumed silica particles are dispersed, (vi) 0 to 0.01 weight percent of catalysts for the reaction of an isocyanate group toward an alcohol, water, a primary amino group or a second amino group, or of an isocyanate group with another isocyanate group to form a carbodiimide and (vii) 0 to 2.5 parts (especially 0 to 1 part) by weight of one or more primary amino and/or second amino compounds. In some embodiments the coating composition includes only ingredients (i)-(vi) in the absence of (vii) and in still other embodiments the coating composition includes only ingredients (i)-(v) in the absence of (vi) and (vii), only ingredients (i)-(iv) in the absence of (v)-(vii) or only ingredients (i)-(iii) in the absence of (iv)-(vii). The coating composition may include only ingredients (i) and (ii).

The various ingredients of the coating composition can be combined to form a mixture that is applied to the particles. Alternatively, the various ingredients can be applied sequentially to the particles, or in various subcombinations. If the coating composition is not fully formulated before applying, it is preferred to first apply the polyisocyanate by itself or some subcombination of ingredients that include the polyisocyanate, followed by the remaining ingredients.

For example, it may be convenient to apply the polyisocyanate first, followed by applying the other ingredients together, singly or in some combination. In such a case, the catalyst may be applied next, followed by or accompanied by the finely divided particles (if used), which are preferably dispersed in water or other liquid phase. In other embodiments of the invention, finely divided particles may be applied after the coating composition is applied, either during the curing step or after the polyisocyanate has cured to form the polyisocyanurate coating.

In other embodiments, the polyisocyanate and at least a portion of the isocyanate trimerization catalyst are combined and applied together, followed by a dispersion of finely divided particles. In such an embodiment, a portion of the catalyst may be applied after the polyisocyanate has been applied but preferably before the dispersion is applied; this is believed to promote additional curing and hardening at the surface of the applied coating.

In still another embodiment, the isocyanate trimerization catalyst and dispersion of finely divided particles are combined into one component of a two-component coating composition, the second component being the polyisocyanate. Such a two-component coating composition can be applied by mixing the components and applying them together or by first applying the polyisocyanate component and then applying the catalyst/dispersion mixture, followed by curing.

The amount of coating composition applied is sufficient to provide 0.1 to 10 parts by weight of the polyisocyanate component per 100 parts by weight of the particles. A preferred amount is sufficient to provide 0.1 to 5, 0.1 to 2.5, or 0.1 to 1.5 parts by weight of the polyisocyanate component, on the same basis.

The applied coating composition of the current invention is heated to the curing temperature by transfer of heat generated in the drying process from the particles, without the need to apply further heating for the curing process after the drying. Curing is performed at a desired temperature of up to 120° C., preferably at least 50° C. or at least 60° C. and may be up to 90° C. or up to 80° C. Thus, preferably, the cooled particles with the second predetermined temperature in the range of 50-120° C., more preferably in the range of 60-90° C., lower than the first predetermined temperature are fed into the inlet of the combined continuous mixer and conveyor unit. Another advantage of this invention is that the coating cures rapidly at such moderately elevated temperatures to form free flowing coated proppant particles. The curing time at such temperatures is typically no greater than 10 minutes and may be as short as one minute. A typical curing time may be 1 to 5 minutes or 2 to 5 minutes.

Curing produces isocyanurate linkages in situ on the surface of the particle as the curing reaction takes place. Other types of linkages formed in the reaction of an isocyanate group with itself or other species, are formed in at most minor amounts (typically 5 mole-% or less based on total moles of linkages formed in the reaction of one or more isocyanates)) due to the lack of effective amounts of urethane, urea and carbodiimide catalysts (and the poor catalytic activity of the isocyanate trimerization catalyst toward reactions that form such groups). As a result, curing and solidification of the liquid starting polyisocyanate takes place mainly through the formation of isocyanurates. In the presence of the isocyanate trimerization catalyst, these linkages form rapidly at the moderate temperatures described above. The relative proportions of isocyanurate linkages and other linkages formed in the reaction of an isocyanate group with itself or other species can be determined using infrared spectroscopy, by comparing the intensities of the absorption signals.

Starch may be present during a portion of the curing step, and becomes incorporated into the polymeric coating. The starch may be partially incorporated into the polymeric coating in the form of particles embedded in an interior and/or on an exterior surface of the solid polymeric coating. Starch has hydroxyl groups, which may react with isocyanate groups to become chemically bonded to the polymeric coating, and so the starch may be incorporated into the polymeric coating in that manner in addition to or instead of forming embedded particles. Embedded particles may become bonded to the polymeric coating through the formation of such chemical bonds.

The starch is a polymeric carbohydrate of glucose units joined by glycosidic bonds, being solid at 23° C. The polymeric carbohydrate molecules may be unbranched or branched. Starch is typically a mixture of amylose, which is a linear and helical polysaccharide made up of α-D-glucose units bonded through α(1→4) glycosidic bonds and no more than one α(1→6) glycosidic bond per 50 glucose units, and amylopectin, which is made up of α-D-glucose units bonded through α(1→4) glycosidic bonds and greater than α(1→6) glycosidic bond per 50 glucose units.

Examples of useful starches are products of one or more plants such as, for example, cereals such as maize, wheat, barley, millet, oats, rye, buckwheat and rice, and root vegetable such as potatoes, sweet potatoes, yams and cassava, as well as other plant sources such as acorns, arrowroot, arrachach, bananas, breadfruit, canna, colcasia, katakuri, kudzu, malange, sago, oca, sorghum, taro, chestnuts and water chestnuts. Corn, wheat, potato, rice and cassava starch are entirely suitable. Modified forms of starch such as pre-gelatinized starch can be used.

In some embodiments, the coating composition includes the starch, i.e., the starch is combined with one or more of the other ingredients of the coating composition and contacted with the substrate together with such other ingredient(s). In such a case, curing takes place in the presence of the starch, which become incorporated into the resulting coating. Alternatively, the components of the coating composition and the starch may be fed separately into the combined continuous mixer and conveying unit at two or more locations along a travel path of the combined continuous mixer and conveyor unit.

In other embodiments, the coating composition is applied to the substrate particles and partially cured before the starch is added. This method has the advantage of simplifying the coating composition and of concentrating the starch near the exposed surface of the cured coating.

The resulting coated proppant particles can be used in the same manner as conventional proppant particles. In a typical hydraulic fracturing operation, a hydraulic fracturing composition, comprising a fracturing fluid, the coated proppant, and optionally various other components is prepared. The fracturing fluid can be a wide variety of fluids such as kerosene and water. Various other components that can be added to the mixture include, but are not limited to, guar and polysaccharides, and well as other components as may be useful.

The fracturing fluid may contain a gelling agent to help prevent the proppant particles from settling prematurely. Such a gelling agent may be dissolved once the formation has been fractured to allow the proppant particles to deposit into the fractures.

The mixture is pumped into the subterranean formation under pressure to create or enlarge fractures in the subterranean formation. Coated proppant particles enter into the fractures and are retained there. When the hydraulic pressure is released, the coated proppant particles hold the fractures open, thereby maintaining a flow path through the fractures to facilitate the extraction of petroleum fuels or other fluids from the formation to the wellbore.

An advantage of the invention is that the coated proppant bonds to itself under conditions of elevated temperature and pressure. This property permits the coated proppants to form agglomerated masses within the subterranean fracture. The agglomerated masses are more resistant to proppant flowback than are the individual proppant particles.

The ability of the coated proppant to bond to itself can be measured in accordance with the unconfined compressive strength (UCS) test described in the following examples. When bonded together under conditions of 1000 psi (6.89 MPa) and 70° C. for 16 hours, the compressive strength of the resulting bonded mass, as measured by the USC test, is in preferred embodiments at least 40 kPa. The compressive strength on this test may be at least 70 kPa or at least 100 kPa and may be up to 500 kPa or up to 300 kPa.

A person having ordinary skill in the art of material transfer and coating of particles can readily understand this disclosure and make the necessary calculations of residence time, paddle pitch, screw speed, dimensions and etc. Thus, it is believed that there has been fully disclosed a process for forming a coated proppant.

As described above sequences, times and temperatures may vary and such variations are considered to be within the scope of this disclosure. The instant invention will significantly lower capital equipment costs, will increase productivity, prove a more consistent product when compared to current art batch processes and reduce energy costs.

EXAMPLE

The following examples are provided to illustrate the invention, and are not intended to limit the scope thereof. All parts and percentages are by weight unless otherwise indicated.

Polyisocyanate A is a polymeric MDI product having an isocyanate functionality of 2.7 isocyanate groups per molecule and an isocyanate content of 30.4-32.0%.

Polyisocyanate B is a polymeric MDI product having an isocyanate functionality of 2.2-2.3 isocyanate groups per molecule and an isocyanate content of 32.1-33.3%.

Polyisocyanate C is a polymeric MDI product having an isocyanate functionality of 2.3 isocyanate groups per molecule and an isocyanate content of 31.3-32.6%.

Polyisocyanate D is a polymeric MDI product having an isocyanate functionality of 3.2 isocyanate groups per molecule and an isocyanate content of 29.0-31.3%.

Catalyst A is a 2-(hydroxylpropyl)trimethylammonium formate product in a hydroxylic carrier, available commercially from Air Products as Dabco TMR-2 catalyst.

Catalyst B is a quaternary amine trimerization catalyst product in a hydroxylic carrier, available commercially from Air Products as Dabco TMR-7 catalyst.

Catalyst C is a quaternary amine trimerization catalyst product in a hydroxylic carrier, available commercially from Air Products as Dabco TMR-18 catalyst.

Catalyst D is a quaternary amine trimerization catalyst product in a hydroxylic carrier, available commercially from Air Products as Dabco TMR-20 catalyst.

Catalyst E is a 1:2.7 by weight blend of 3-methyl-1-phenyl-2-phospholene-oxide in glycerol.

The fumed silica is a 30% solids, alkaline dispersion of submicron-sized fumed silica particles in an aqueous phase.

The sand used in the following experiments is a 40/70 mesh sand product.

The starch is a cornstarch product in which the particles are less than 25 μm in size.

Examples 1-11 and Comparative Samples A-G

Standard coating procedure for Examples 1-10: 750 grams of sand are preheated to the coating temperature indicated in Table 1, and loaded into a Hobart type laboratory mixer. Separately, a blend of polyisocyanate and catalyst as indicated in Table 1 is prepared and added to the preheated sand with vigorous mixing. After mixing for one minute, the fumed silica dispersion is added and mixing is continued another two minutes. The free-flowing sand product thus obtained is discharged into plastic bags and stored at room temperature for several days before being evaluated for unconfined compressive strength (UCS).

interior diameter steel cylindrical cell with removable top and bottom assemblies. Excess water is drained from the cell. A piston is placed at the top of the sample chamber and hammered into the cell. The top assembly equipped with a pressure relief valve and a nitrogen inlet is attached to the cell. The cell is pressurized to 1000 psi (6.89 MPa) with nitrogen, then kept overnight in a 70° C. oven. The cell is then cooled to room temperature. The sand plug is removed from the cell and dried under ambient conditions for a day to remove absorbed water. The plug is then broken into 2-inch (5.08 cm) pieces, filed at the edges to smooth them. Plugs are tested for compressive strength using an MTS insight electromechanical testing system with a 2000 kilonewton load cell and a compression rate of 0.01 in/minute (0.254 mm/minute). The peak stress value is reported as the UCS.

TABLE 1

| Sample | Sand, pbw | Polyisocyanate Type | pbw | Catalyst Type | pbw | Fumed Silica Dispersion, pbw | Curing Conditions Temp., °C. | Time, s |
|---|---|---|---|---|---|---|---|---|
| A* | 750 | | | Untreated Sand | | | | |
| B* | 750 | A | 7.5 | None | | None | 60 | 120-180 |
| C* | 750 | B | 7.5 | None | | None | 60 | 120-180 |
| D* | 750 | A | 7.5 | E | 0.34 | None | 60 | 120-180 |
| E* | 750 | B | 7.5 | E | 0.34 | None | 60 | 120-180 |
| F* | 750 | None | 0 | None | 0 | 10.2 | 60 | 120-180 |
| G* | 750 | A | 7.5 | None | 0 | 10.2 | 70 | 120-180 |
| 1 | 750 | A | 7.5 | A | 0.09 | 10.2 | 60 | 120-180 |
| 2 | 750 | A | 7.5 | B | 0.15 | 10.2 | 60 | 120-180 |
| 3 | 750 | A | 7.5 | C | 0.09 | 10.2 | 60 | 120-180 |
| 4 | 750 | A | 7.5 | D | 0.15 | 10.2 | 60 | 120-180 |
| 5 | 750 | A | 7.5 | A | 0.13 | 8.4 | 70 | 120-180 |
| 6 | 750 | A | 7.5 | A | 0.20 | 6 | 70 | 120-180 |
| 7 | 750 | A | 5.0 | A | 0.06 | 5.4 | 60 | 120-180 |
| 8 | 750 | A | 3.8 | A | 0.06 | 5.4 | 60 | 120-180 |
| 9 | 750 | B | 7.5 | A | 0.27 | 9.6 | 70 | 120-180 |
| 10 | 750 | C | 7.5 | A | 0.18 | 10.2 | 70 | 120-180 |
| 11 | 750 | D | 7.5 | A | 0.4 | 10.2 | 70 | 120-180 |

*Comparative.
"pbw" means parts by weight.

For Example 11, the standard coating procedure is modified in that the polyisocyanate and catalyst are added to the sand separately but simultaneously.

Under these curing conditions (temperature, time, presence of trimerization catalyst, and absence of urethane catalyst) the polyisocyanate reacts predominately with itself to form isocyanurates. A small quantity of ureas may form due to reaction of isocyanate groups with water, and a small amount of other linkages such as biurets may form, but these groups are present in amounts of less than 5 mole-%.

Comparative Sample A is uncoated sand. Comparative Samples B-E are made using the standard coating procedure, but the trimerization catalyst is omitted. In Comparative Samples D and E, a carbodiimide catalyst rather than a trimerization catalyst is present. In Comparative Example F, only the fumed silica dispersion is coated on the sand. In Comparative Example G, trimerization catalyst is omitted but fumed silica dispersion is added. The formulations are as reported in Table 1.

UCS is measured by first sieving the coated sand through 1 mm metal screens. The sieved sand is mixed with a solution of 2% potassium chloride in water, at a volume ratio of 4 parts sand to 3 parts solution. 1 drop of dish soap is added to eliminate air entrainment. The resulting slurry is allowed to stand for 5 minutes, and then loaded into a 1.125

TABLE 2

| Sample | Coated Sand Characteristics | UCS, kPa (psi) |
|---|---|---|
| A* | Free flowing | 0 |
| B* | Completely aggregated | NM |
| C* | Completely aggregated | NM |
| D* | Completely aggregated | NM |
| E* | Completely aggregated | NM |
| F* | Free Flowing | 0 |
| G* | Not free flowing | NM |
| 1 | Free flowing | 165 (24) |
| 2 | Free flowing | 200 (29) |
| 3 | Free flowing | 193 (28) |
| 4 | Free flowing | 165 (24) |
| 5 | Free flowing | 241 (35) |
| 6 | Free flowing | 159 (23) |
| 7 | Free flowing | 48 (7) |
| 8 | Free flowing | 41 (6) |
| 9 | Free flowing | 152 (22) |
| 10 | Free flowing | 145 (21) |
| 11 | Free flowing | 117 (17) |

*Comparative.
NM means "not measured".

As the data in Table 2 shows, uncoated sand is free flowing but does not bond under the UCS test conditions.

In the absence of a catalyst (Comparative Samples B, C and G), the polyisocyanate does not cure under these conditions and the sand becomes completely or partially aggregated during the coating process. Adding a carbodiimide catalyst (Comparative Samples D and E) does not promote curing under these conditions, again leading to complete aggregation of the sand as it is coated. In absence of polyisocyanate (Comparative Example F), sand is not able to bond with other particles and has no UCS.

In contrast, the coating formulations of examples 1-11 each cure within 3 minutes at a moderate temperature of 60-70° C. The coated sand in each case flows freely, as does the untreated sand of Example 1. In the UCS test, the coated sand bonds to form a strong plug. The lower UCS values of Examples 7 and 8 are believed to be attributable to the lower coating weights. In particular, examples 1-10, in which the polyisocyanate and the catalyst are blended first, and then added to the sand, achieve the desired good performance, and are preferred for the current invention.

Examples 12-14

Spray-coated sand is made as follows. The polyisocyanate and catalyst are mixed at room temperature on a high speed laboratory mixer. The sand is preheated to 70° C. and loaded into a Hobart type mixer. The polyisocyanate/catalyst blend is sprayed onto the sand as it is mixed in the mixer, using a Paasche VL Airbrush spray operated at a pressure of 3800-5000 kPa (80-100 psi). After the coating composition has at least partially cured, the fumed silica dispersion is sprayed onto the sand in the same manner. The resulting free flowing coated sand is discharged into a plastic bag after a cycle time (coating and curing) of 120-180 seconds. The coated sand tested for the UCS. Formulation details, coating conditions and UCS values are as described in the table below:

TABLE 3

| Example number | 12 | 13 | 14 |
|---|---|---|---|
| Sand, pbw | 750 | 750 | 750 |
| Polyisocyanate A, pbw | 7.3 | | |
| Polyisocyanate B, pbw | | 7.5 | |
| Polyisocyanate C, pbw | | | 7.5 |
| Catalyst A, pbw | 0.09 | 0.18 | 0.27 |
| Fumed Silica dispersion, pbw | 9.3 | 10.0 | 10.1 |
| Coating temp., ° C. | 70 | 70 | 70 |
| Cycle time, sec. | 120-180 | 120-180 | 120-180 |
| UCS, kPa (psi) | 76 (11) | 48 (7) | 103 (15) |

Good results are obtained in a spray coating process. The sand does not aggregate when coated yet bonds well under heat and pressure.

Examples 12-14 also demonstrate that the fumed silica can be added to the proppant separately, after the polyisocyanate and catalyst have been applied.

Examples 15-17

10 parts of Polyisocyanate A and 0.12 part of Catalyst A are mixed at room temperature on a high speed laboratory mixer. The sand is preheated to 70° C. and loaded into a Hobart type mixer. The polyisocyanate/catalyst mixture is combined with the sand as the sand is mixing, and allowed to cure for 1 minute. An additional amount of Catalyst A is then added, and the fumed silica dispersion sprayed onto the coated sand using a Paasche VL Airbrush sprayer. Total cycle time is 2-3 minutes. Free flowing coated sand obtained at the end of the coating process is discharged into plastic bag and tested for the UCS. Formulation details, coating conditions and UCS values are described in the table below.

TABLE 4

| Example number | 15 | 16 | 17 |
|---|---|---|---|
| Sand, pbw | 750 | 750 | 750 |
| Polyisocyanate A/Catalyst A blend, pbw | 7.5 | 7.5 | 7.5 |
| Second Catalyst A addition, pbw | 0.4 | 0.3 | 0.2 |
| Fumed Silica Dispersion, pbw | 2.6 | 6.5 | 8.5 |
| UCS, kPa, (psi) | 90 (13) | 110 (16) | 200 (29) |

By adding more catalyst after the initial coating has been applied and at least partially cured, the amount of fumed silica can be reduced while still obtaining a free-flowing product that bonds well under applied heat and pressure.

Example 18

A proppant is prepared by applying the coating on sand in a continuous coating process. Three continuous mixers connected in series are used to prepare the coating. Mesh 40/70 sand was heated to a temperature of 87° C., and no additional heating is applied to the sand during the subsequent coating process. The heated sand is loaded into the feed hopper of a Tinker Omega TOM50 high speed continuous sand mixer. For preparing the coating, sand is fed to the mixer at a feed rate of 40-45 lbs/minute (18.18-20.45 kg/minute). The Polyisocyanate A is added to the sand under the feed hopper in the TOM50 mixer at a rate of 0.45 lbs/minute (0.2045 kg/minute). Catalyst C is added further downstream in the TOM50 mixer at a rate of 0.04 lbs/minute (0.01818 kg/minute). Sand is mixed vigorously with the coating components inside the mixer. Sand coming out of this mixer is discharged into a Sintoamerica 6S speedflow continuous mixer. Cornstarch is added to the sand while the sand is mixing in this mixer using a Coperion KT20 gravimetric feeder, at a feed rate of 0.2 lbs/minute (0.0909 kg/minute). Sand coming out of the 6S speedflow mixer is fed to a Sintoamerica 4S speedflow mixer. Sand coming at the outlet of the 4S speedflow mixer is collected in plastic pails for further testing. The coated sand is free flowing.

Loss on Ignition (LOI) of this coating is measured according to ISO 13503-2 and found to be 1.61%.

The UCS of this sample is measured according to the procedure described in the earlier examples and found to be 32 psi (220.6 kPa).

The crush strength of this sample is tested according to ISO 13503-2 and found to be 13000 psi (89.6 MPa), while the uncoated sand has a crush strength of only 10,000 psi (69 MPa).

Dry caking is evaluated by placing a coated sand sample in a split cylindrical cell of 2 inches (5.08 cm) in diameter. A weight is applied on top of the sand to generate 6 psi (41.4 kPa) pressure. This setup is placed in an oven at 50° C. for 24 hours. The weight is then removed and the cylindrical cell is split open to visually observe formation of caked clusters. No clumps or caked clusters form.

This example shows that coating of the invention can be applied in a continuous process while no additional heat is being applied. The coated sand has benefits of improved crush resistance and improved UCS while not showing any dry caking.

What is claimed is:

1. A continuous process for forming a coated proppant, said process comprising the steps of:
   (a) washing particles,
   (b) drying the particles at a first predetermined temperature,
   (c) cooling the particles,
   (d) feeding the cooled particles with a second predetermined temperature lower than the first predetermined temperature to an inlet of a combined continuous mixer and conveyor unit, the combined continuous mixer and conveyor unit includes multiple continuous mixers connected in series,
   (e) feeding a coating composition into the combined continuous mixer and conveyor unit,
   (f) mixing and simultaneously conveying the particles and the coating composition for a predetermined time,
   (g) curing the coating composition by transfer of heat from the particles,
   (h) discharging the coated particles from an outlet of the combined continuous mixer and conveyor unit,
   wherein said process does not comprise a step of heating the particles after the drying and components of the coating composition are fed separately at two or more different locations along a travel path of the combined continuous mixer and conveyor unit into the combined continuous mixer and conveying unit.

2. The process of claim 1 wherein said process does not comprise a step of cooling the coated particles after the discharging.

3. The process of claim 1 wherein the first predetermined temperature is in the range of 500° C. to 1500° C., wherein the second predetermined temperature is in the range of 50° C. to 220° C.

4. The process of claim 3 wherein the second predetermined temperature is in the range of 50° C. to 120° C., and wherein the coating composition comprises at least one polyisocyanate and an isocyanate trimerization catalyst.

5. The process of claim 4 wherein the coating composition is cured for a period of up to 10 minutes on the surface of the particles to form a solid polymeric coating.

6. The process of claim 4 wherein the coating composition further comprises finely divided fumed silica.

7. The process of claim 4 wherein said particles are sand.

8. The process of claim 4 wherein said coating composition is in liquid form.

9. The process of claim 4 wherein said coating composition is sprayed onto the particles.

10. The process of claim 4 wherein the coating composition is partially cured.

11. The process of claim 1 wherein during the step (f) mixing and simultaneously conveying the particles and the coating composition for a predetermined time, cornstarch is added to the sand.

12. The process of claim 1 wherein the multiple continuous mixers connected in series includes three different mixers.

* * * * *